United States Patent
Ganiere

(10) Patent No.: US 7,510,169 B2
(45) Date of Patent: Mar. 31, 2009

(54) AIRCRAFT 400 HZ CABLE HOIST

(76) Inventor: Jeff Ganiere, 330 N. Spring Blvd., Tarpon Springs, FL (US) 34689

( * ) Notice: Subject to any disclaimer, the term of this patent is extended or adjusted under 35 U.S.C. 154(b) by 117 days.

(21) Appl. No.: 11/758,777

(22) Filed: Jun. 6, 2007

(65) Prior Publication Data

US 2008/0304948 A1    Dec. 11, 2008

(51) Int. Cl.
B66D 1/48 (2006.01)
(52) U.S. Cl. .................. 254/271; 254/272; 254/273
(58) Field of Classification Search .............. 254/270, 254/271, 272, 273
See application file for complete search history.

(56) References Cited

U.S. PATENT DOCUMENTS

| | | | |
|---|---|---|---|
| 1,945,712 A | 2/1934 | Wadd | |
| 2,266,660 A | 12/1941 | Sloan | |
| 2,661,405 A | 12/1953 | Western | |
| 3,740,021 A | 6/1973 | Sommer | |
| 3,834,551 A | 9/1974 | Nonowsky | |
| 4,042,213 A | 8/1977 | Schreyer et al. | |
| 4,434,873 A * | 3/1984 | Ohta et al. | 187/277 |
| 4,434,971 A * | 3/1984 | Cordrey | 254/273 |
| 4,447,043 A | 5/1984 | Bocchiaro | |
| 4,858,855 A | 8/1989 | Dalbera | |
| 5,350,075 A | 9/1994 | Kahlman | |
| 5,351,430 A * | 10/1994 | Hystad | 43/9.1 |
| 5,361,565 A * | 11/1994 | Bayer | 254/292 |
| 5,405,027 A | 4/1995 | Plass | |
| 5,615,865 A | 4/1997 | Fountain | |
| 5,662,311 A | 9/1997 | Waedekin et al. | |
| 6,142,448 A * | 11/2000 | Fujiwara et al. | 254/271 |
| 6,299,139 B1 * | 10/2001 | Kazerooni | 254/270 |
| 6,349,441 B1 | 2/2002 | Kosuch | |
| 6,886,812 B2 * | 5/2005 | Kazerooni | 254/270 |
| 6,916,015 B2 * | 7/2005 | Andreasson | 254/270 |
| 6,966,544 B2 | 11/2005 | McCormick et al. | |
| 6,974,044 B1 | 12/2005 | Munnekehoff | |
| 7,311,297 B1 * | 12/2007 | Bradshaw et al. | 254/272 |
| 2002/0144969 A1 | 10/2002 | Laundry et al. | |
| 2005/0179020 A1 | 8/2005 | Taylor et al. | |
| 2006/0163546 A1 * | 7/2006 | Marcil | 254/271 |
| 2006/0226106 A1 | 10/2006 | Zaguroli, Jr. | |
| 2007/0023379 A1 | 2/2007 | Kahlman et al. | |

* cited by examiner

Primary Examiner—Emmanuel M Marcelo
(74) Attorney, Agent, or Firm—Dennis G. LaPointe

(57) ABSTRACT

A hoist system for handling a 400 Hz cable used for aircraft electrical servicing, that utilizes electrical circuitry where wire rope position sensing is accomplished using a grounding circuitry. The system employs an AC drive that relies on circuit completion through "sinking logic." Electrically connected are wire rope guide rollers, a control pendant, a bridge horizontal control relay, which is in electrical communication with a horizontal bridge lock-out bar. The wire rope is used as an electrical conductor for control voltage only. A lower limit contact bar extends above a plane between the wire rope guide rollers and the take-up spool, as serves to prevent the wire rope from rewinding in a reverse manner on the take-up spool. A horizontal bridge lock-out bar extends above a plane between the wire rope guide rollers and the take-up spool and is used to allow or inhibit horizontal bridge movement.

4 Claims, 8 Drawing Sheets

UPPER LIMIT

Horizontal Lock Out— Bridge can be driven

Horizontal lock out— Bridge can not be moved

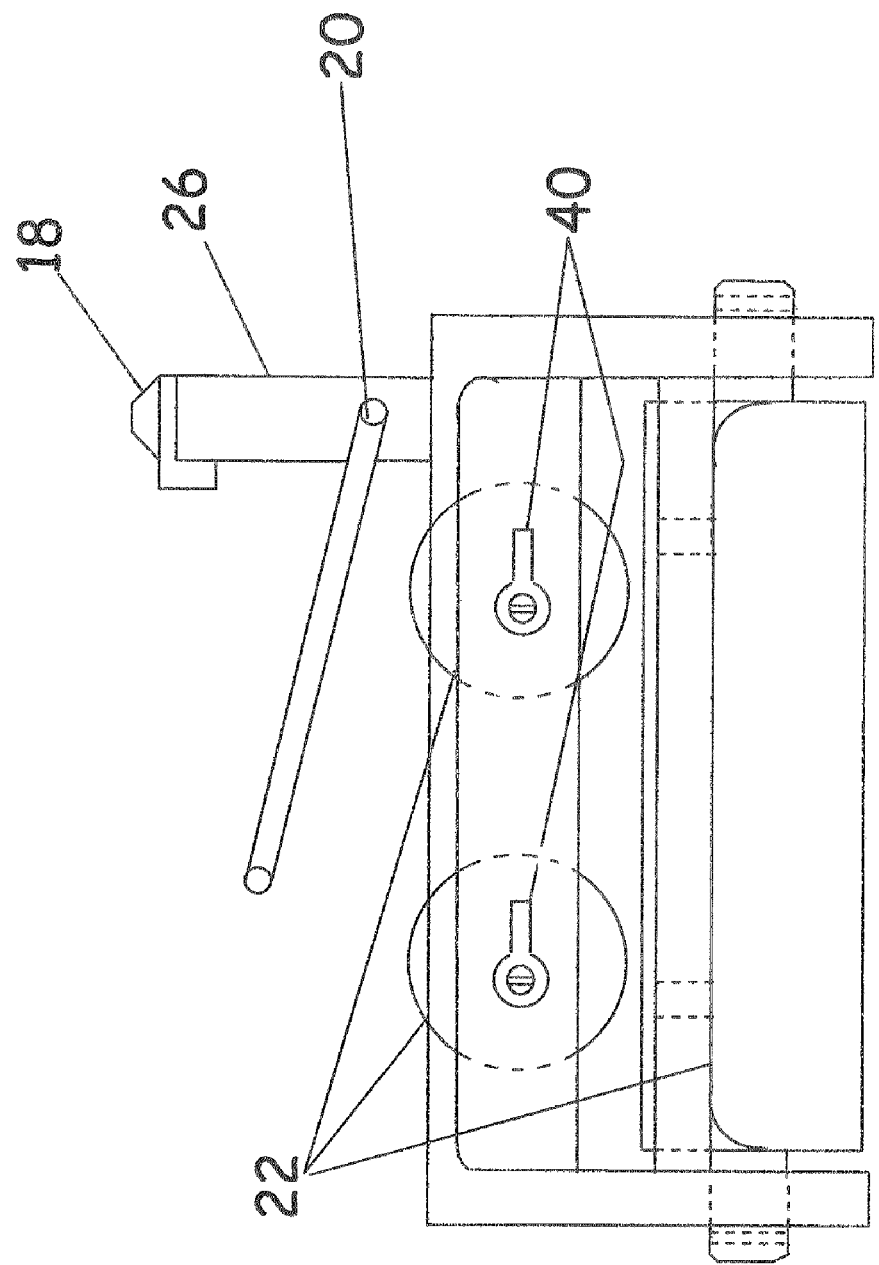

US 7,510,169 B2

AIRCRAFT 400 HZ CABLE HOIST

FIELD OF THE INVENTION

The invention relates to a hoist system installed on a passenger boarding bridge to handle a 400 Hertz power supply cable, which provides electrical service to the aircraft while its engines are shut off.

BACKGROUND OF THE INVENTION

The standard method used to load and off-load passengers onto jet aircraft passenger liners is through the use of a Passenger Boarding Bridge (PBB). A Passenger Boarding Bridge is a moveable walkway that attaches to the airport terminal building at one end and at the other end is capable of being driven to join the aircraft door. This provides a continuous walkway from the aircraft to the terminal. Typically, Passenger Boarding Bridges, in addition to providing a smooth floor surface have side walls and a roof to protect passengers from the elements. In addition to providing a convenient walkway for passengers, the Passenger Boarding Bridge is also used to mount pieces of equipment that service the aircraft docked at the Passenger Boarding Bridge.

The subject of this Patent Application is for one such piece of equipment. It is a common practice to install a 400 Hertz power supply to the underside of a PBB to provide electrical service to the aircraft while its engines are shut off. The power transmission cord is a large heavy extension cord weighing as much as 250 pounds. When this cord is left lying on the tarmac, it is easy for the cord to be run over and damaged as the PBB is driven up to or backed away from the aircraft. Therefore, it is common practice to locate a winch on the PBB such as at the roof level of the PBB, on the side closest to the aircraft, to hoist the cable off the ground while not in use, thereby keeping it out of harm's way.

All such cable winches use a wire rope wound around a drum attached to a motor to raise and lower cable clamps attached to the 400 Hertz power cable. All such winches use an upper limit switch consisting of a slotted cable guide on a hinge that when a Fob, larger in diameter than the width of the slot in the cable guide comes in contact with the cable guide, it is then lifted and strikes a mechanical switch, turning off the motor.

The problem with such an upper limit switch device is that if the cable is not directly under the winch, the cable, owing to its divergence from vertical, moves the upper limit cable guide up, thereby shutting off the winch before the cable has been taken up. Because of this inherent problem, the winch operator must gather the wire rope and the 400 Hz power cord directly under the winch in order to hoist it up. The present invention described hereinafter allows the winch to operate regardless of the angle of the wire rope to the winch. There is never a need for the operator to gather the 200 pound plus cable under the winch in order to raise it.

Additionally, with other hoists, it is possible for the operator to completely unroll the wire rope from the drum. In that case, the wire rope can be easily rewound the wrong way on the drum, so that when the down button is pressed, the rope actually goes up. Subsequently the motor can be overloaded to the extent that a fuse would be blown. Some hoists employ a switch connected to a lever that trips if the cable starts in the wrong direction on the drum. However mechanical switches and levers are difficult to adjust, add extra expense and complicate the design. The present invention precludes the possibility of the cable winding the wrong direction on the drum without the use of a separate switch and lever.

Additionally, it is customary to include another separate switch that is activated by the position of the cable guide to disable the bridges ability to be driven until the cable is all the way up in its home position. The present invention incorporates that requirement in the wire rope guide and therefore eliminates the need for a separate switch.

An inherent problem existing with all prior art hoist systems used on PBB's is excessive wire rope tensioning. In order to suspend a 250 pound static load aloft on a drum while not in use requires the addition of a mechanical break on the electric winch motor. In all other cable hoists, as soon as the upper limit switch on the wire rope guide goes open, the motor break is employed. The break is deployed before the motor can ramp down. Therefore the motor comes to a jarring halt and the full torque load is placed on the wire rope guide and the wire rope, not to mention the drive bearings. This needless torque load which is many times that of the weight the hoist is designed to lift shortens the life of the wire rope and the motor.

SUMMARY OF THE INVENTION

The present invention differs from existing equipment for the following reasons.
1. No separate mechanical switches requiring strain relief connectors and separate mounting hardware are required.
2. Wire rope position sensing is accomplished by using a simple grounding system explained below.
3. Additionally, the wire rope is used as an electrical conductor for control voltage only. It must be stressed that no electrical current flows through the wire rope from the point of conductance to the end of the cable. The current that does flow between the take up spool and the contact point is a very low voltage with only about 3 milliamps of current draw. This is much the same way that the chassis on an automobile is used for common, or ground Voltage to operate the electric motor and brake is wired using convention standards.
4. The present invention employs an AC Drive that relies, on circuit completion through "sinking" logic. The advantage to using an AC Drive are numerous, but not the focus of this patent application The basis of the present invention is the wire rope roller guides and attachments as depicted in the drawings described below.

The Advantages to the Present Invention Are:
1. Easy re-winding. The wire rope can be re-wound without having to gather all the wire rope and cable directly under the hoist.
2. Increased controllability over other systems. In a situation when the power cable becomes entangled with an obstacle such as the PBB wheels or aircraft wheels, an attempt to raise the power cable will cause undue current torque on the motor. This will result in blowing a fuse, shutting down the motor and ultimately shortening the life of the motor. In the present invention, current control ensures that the motor will shut down if the current draw for lifting a maximum of 250 pounds is exceeded.
3. Simplified construction. There are no individually mounted mechanical switches to mount and adjust.

How the Invention Works:

The present, invention utilizes an AC Drive in conjunction with an electric motor, motor brake and the cable guide. The cable guide provides all the logic to the AC Drive to inhibit overdriving the upper and lower wire rope limits and it provides an elegant solution to lock out horizontal bridge movement.

The basis of the mechanical switching logic is that the AC Drive will not process conflicting commands. If the "Up" and "Down", or forward and reverse commands are energized at the same time, the Drive will stop until only one command remains. The wire rope cable guide makes use of the AC Drive conventions. The AC Drive requires that a circuit be completed between Up, or Down to the Common terminal in order for the drive to process a command (NPN).

In addition to the Wire Rope Guide there is also a push button control station with "Up" and "Down" switch buttons. Typically, the operator will go to the push button station and press the Down button if he/she wishes to lower the cable or the Up button if he/she wishes to raise the cable. The hoist motor will automatically stop when the wire rope is fully retracted. Conversely, the hoist motor will stop when the wire rope is completely unwound.

Additionally, when the wire rope is not in the fully retracted position a contact is opened that inhibits horizontal bridge movement (the bridge can't be driven if the cable is not fully retracted).

Operating Sequence
1. The Up Command
    The operator must press the Up button on the control station and the motor will start rotating in the up direction and rewind the wire rope until the Fob at the end of the cable touches both wire rope guide rollers, at which time a second command is presented to the AC Drive so it will stop the motor. When the push button is released, only the Down command is present, so the AC Drive will start the motor in the rewind direction until the Fob is no longer in contact with both rollers.
2. The Down Command
    When the Down button is pressed on the control station, the spool unwinds until the button is released or until the wire rope completely unrolls from the spool and starts to rewind in the wrong direction on the spool. When the wire rope comes in contact with the lower limit bar the drive is presented an additional command and therefore stops the drive motor. When the Down button on the control station is released by the operator, only the Up command is energized, so the AC Drive will start the motor to am in the Up direction until the wire rope no longer touches the lower limit bar.
3. Horizontal Bridge Lockout
    As soon as the wire rope un-spools about six inches, the PVC insulator at the end of the wire rope will no longer be in contact with the Horizontal Lockout Brush, therefore a circuit will be completed between common and the Horizontal Lockout relay and it will not be possible to laterally drive the bridge until the cable hoist is fully retracted.

Components
1. Up Limit Rollers: When the cable is being raised and the Fob on the wire rope makes contact with the Up Limit Rollers, the up motion is stopped. Two of the rollers on the wire rope guide are partially filled with Bronze Wool. The bronze wool acts as a brush that provides a positive electrical connection between the roller spindles and the rollers. Electrical terminals are led from the two spindle ends. One of the spindle terminals goes to around, or common, the other goes to the down terminal on the AC Drive.
2. Down Limit Contact: A contact bar located between the take up spool and the wire rope rollers is so located that when the wire on the spool runs out and starts to wind up in reverse on the spool, it must touch the lower limit bar, because the lower limit bar extends above a plain between the wire rope roller and the take up spool when the wire rope is wound in the wrong direction on the spool. Therefore, the wire rope must touch the lower limit bar and a circuit from ground to Up on the AC Drive is completed. While the button on the control station is pressed and the Down limit is made, the AC Drive will stop the motor. When the Down button on the control station is released, the AC Drive will start the motor in the up direction until the wire rope no longer touches the Down limit bar.
3. Horizontal Bridge Lock-out: Most passenger boarding bridges have a facility that when a two wire circuit is completed, the horizontal control (driving the bridge) is inhibited. Most airlines and airports require this switching capability to be incorporated into the winch so that when the 400 Hz cable is lowered, the bridge can not be driven in an effort to minimize electrical shock hazard and damage to the 400 Hz cable.
    The present invention incorporates a separate stainless steel bar, mounted above the rollers, but below the take up spool so that if the stainless steel wire rope touches the bar a circuit between a separate relay and ground is completed, thereby energizing a coil in a relay, which in turn switches from Normally Closed to Open.
    There is also, a six inch long PVC tube with an inner diameter slightly larger than the diameter of the wire rope that resides just above the Fob and extends about six inches above the Fob.
    When the cable is fully retracted the Horizontal lockout brush rests against the PVC and the circuit to ground cannot be completed. Therefore, the PBB can be driven. When the brush comes in contact with the wire rope the circuit is completed and the relay is energizes and the bridge cannot be driven.

BRIEF DESCRIPTION OF THE DRAWINGS

In the accompanying drawings:
FIG. 3C is an end view of the wire rope guides.

DETAILED DESCRIPTION OF THE INVENTION

Figure 1:
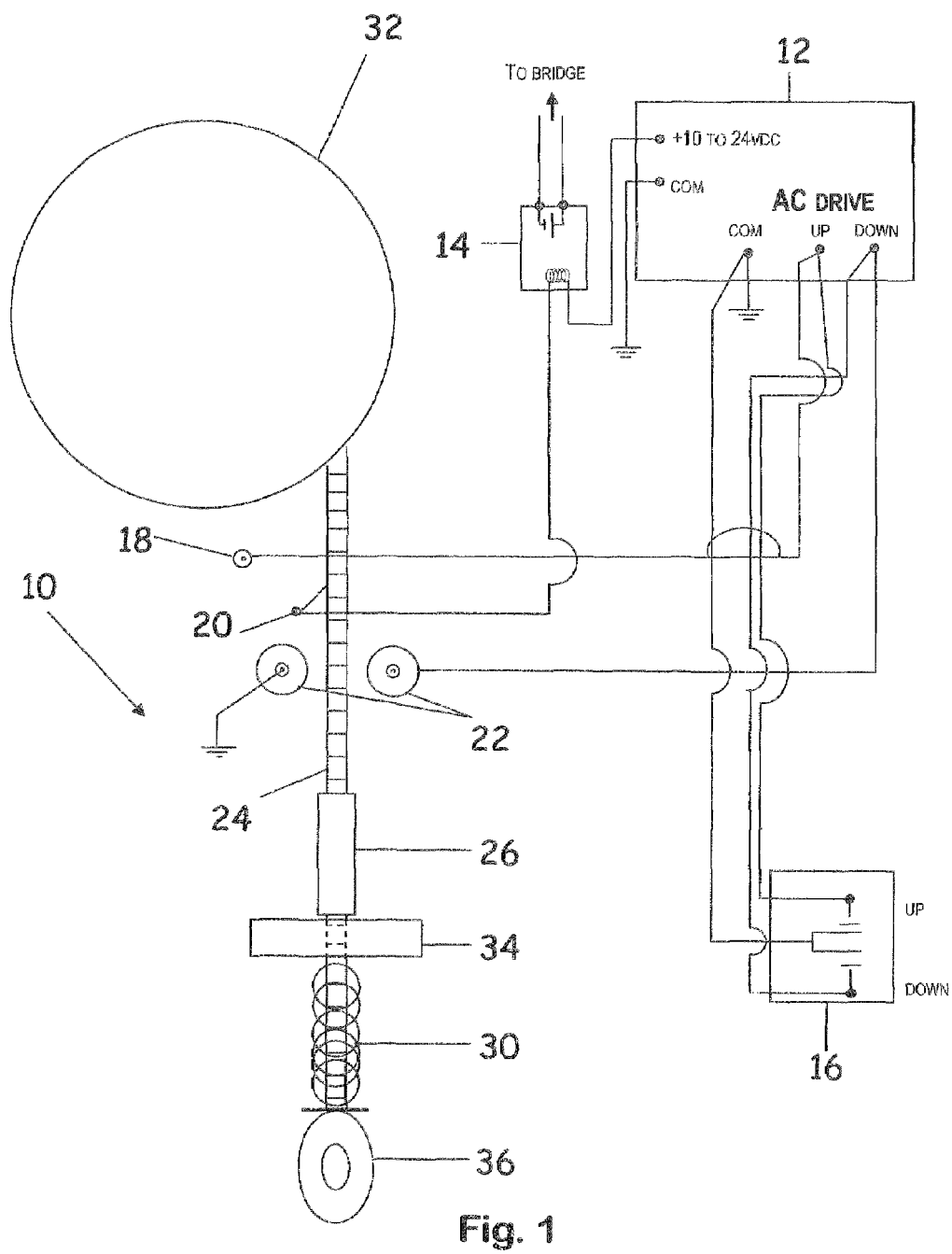
FIG. 1 is a conceptual 400 Hz Cable Hoist Wiring schematic according to the present invention.

Referring now to the drawings. FIG. 1 is a conceptual 400 Hz Cable Hoist Wiring schematic according to the present invention, a hoist system, generally referred to herein as 10, for handling a 400 Hz cable (not shown) used for aircraft electrical servicing. The system 10 is typically attached to a passenger boarding bridge enclosure portion near the aircraft to be electrically serviced.

The hoist system 10 comprises a plurality of wire rope guide rollers 22 and an AC drive 12 for providing electrical power to the hoist system 10. The AC drive 12 is in alternating current electrical communication with a control pendant 16 and the wire rope guide rollers 22 and is also in direct current communication with a bridge horizontal control relay 14, which is in electrical communication with a horizontal bridge lock-out contact member 20. This member 20 is also referred to herein as a bar or brush.

A wire rope 24 is attached on one end to a take-up spool 32 and a Fob 34 is located located near a holder end or cable eye 36 for the cable (not shown). Typically, the cable is connected within a saddle (not shown) to a hoist assembly connection member (also not shown), which attaches to the cable eye 36.

An insulator 26, typically made from a polyvinyl chloride (PVC) cover or tubing material, is provided around the wire rope 24 and is located on an upper side of the Fob 34. The length of the insulator 26 is predetermined but may be, for example, about 6 inches long.

As shown in the drawings in general, typically a compression spring 30 is locate between the cable eye 36 and the Fob 34.

The system 10 is grounded electrically in such a way as to provide means for wire rope position sensing. This includes the use of a lower limit contact member or reverse bar 18, which extends above a plane between the wire rope guide rollers 22 and the take-up spool 32. The lower limit contact bar 18 provides electrical contact means for preventing the wire rope 24 from rewinding in a reverse manner on the take-up spool 32.

The horizontal bridge lock-out contact member 20 extends above a plane between the wire rope guide rollers 22 and the take-up spool 32. When said horizontal bridge lock-out contact member 20 is in contact with the insulator 26, horizontal bridge movement is allowed and when the horizontal bridge lock-out contact member 20 is in contact with the wire rope 24, horizontal bridge movement is inhibited. Operationally, when the wire rope 24 in not in a fully retracted position, a circuit to the AC drive 12 is opened thereby inhibiting horizontal bridge movement.

The wire rope 24 is electrically configured to be used as an electrical conductor for control voltage through a grounding of the take-up spool 32 to which the wire rope 24 is attached. Respective AC and grounding connections to the wire rope guide rollers 22 are made at terminals 40.

The effective or resultant operational benefits of the manner in which the components of the hoist system are connected electrically is that the wire rope guide rollers 22 are electrically connected so as to serve as means for inhibiting overdriving an upper and a lower wire rope limit and for locking out horizontal bridge movement, conflicting commands are not processed, and the AC drive 12 requires a circuit to be completed in order for the AC drive to process a single command.

Figure 2A:
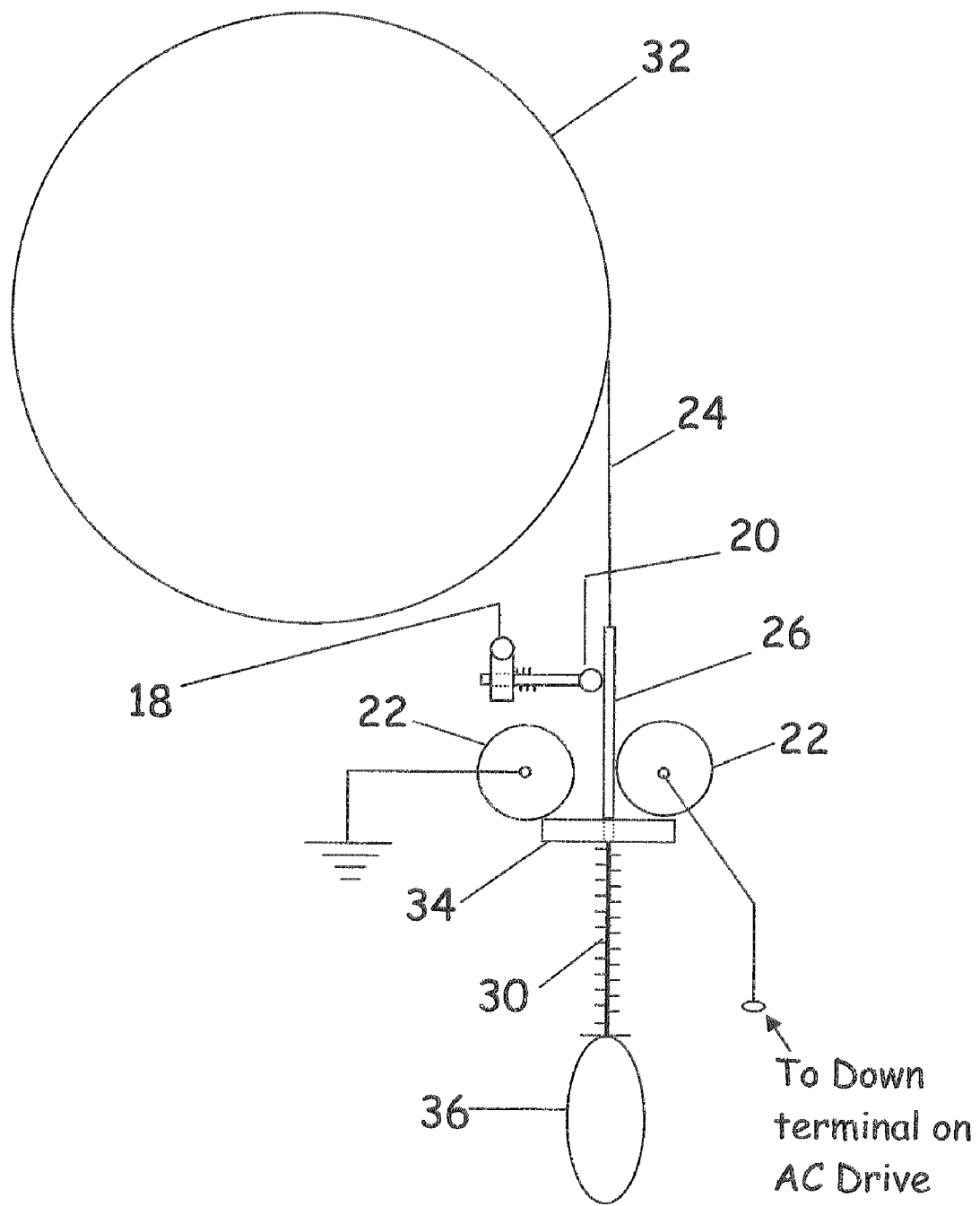
FIG. 2A is a conceptual representation of the present invention in its upper limit position.
Figure 2B:
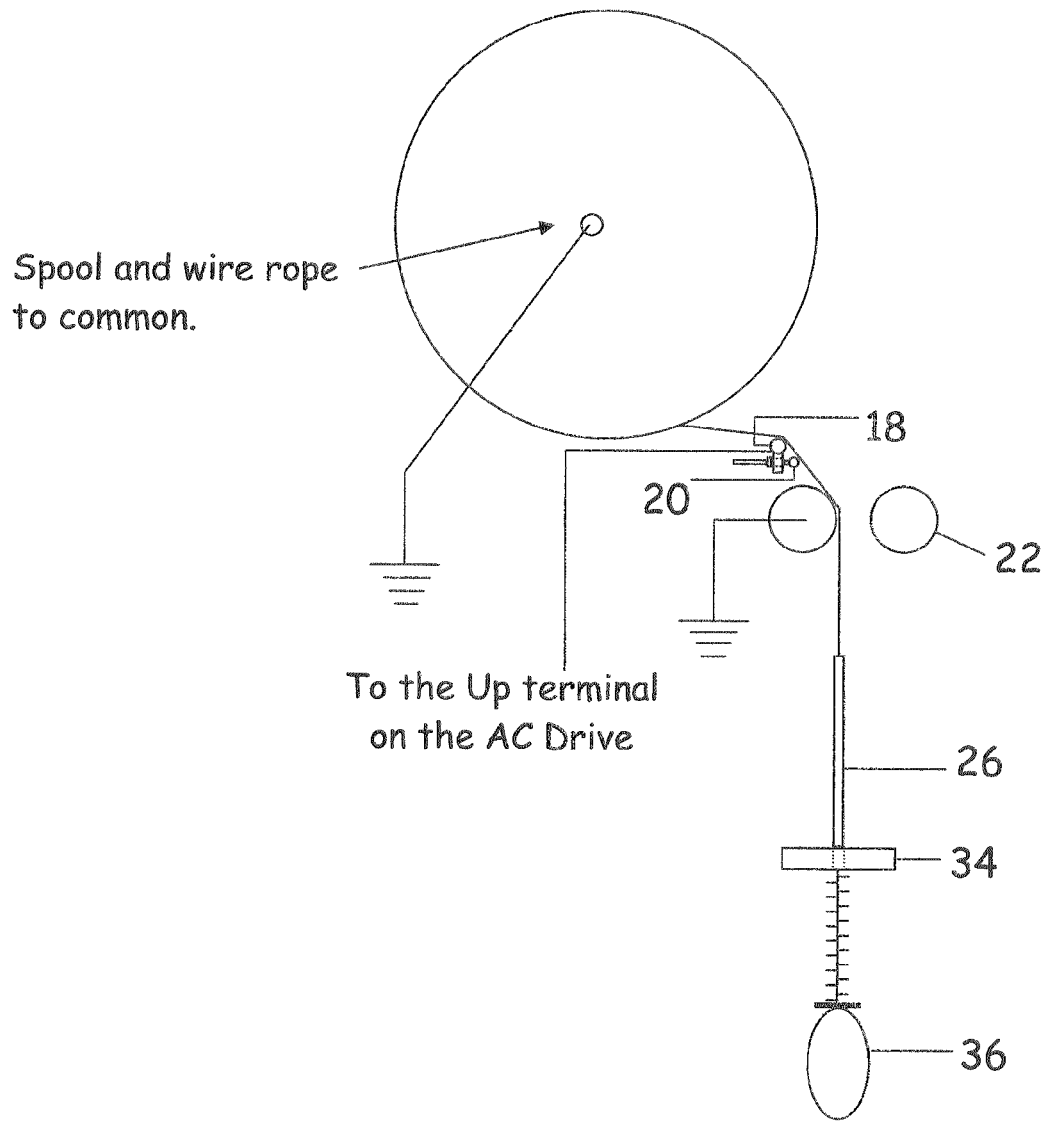
FIG. 2B is a conceptual representation of the present invention in its lower limit position.
Figure 2C:
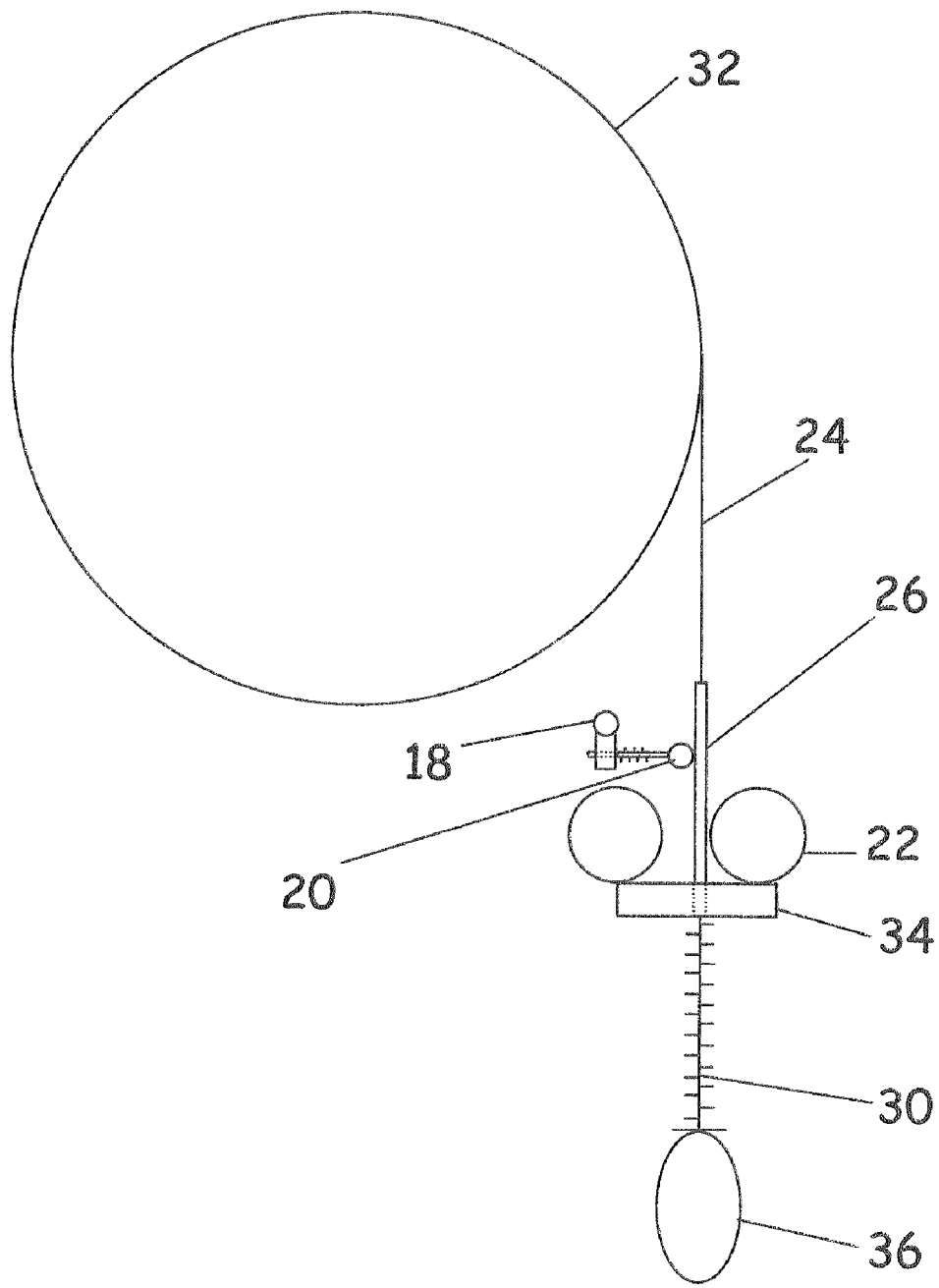
FIG. 2C is a conceptual representation of the present invention in its horizontal lock-out (bridge can be driven) position.
Figure 2D:
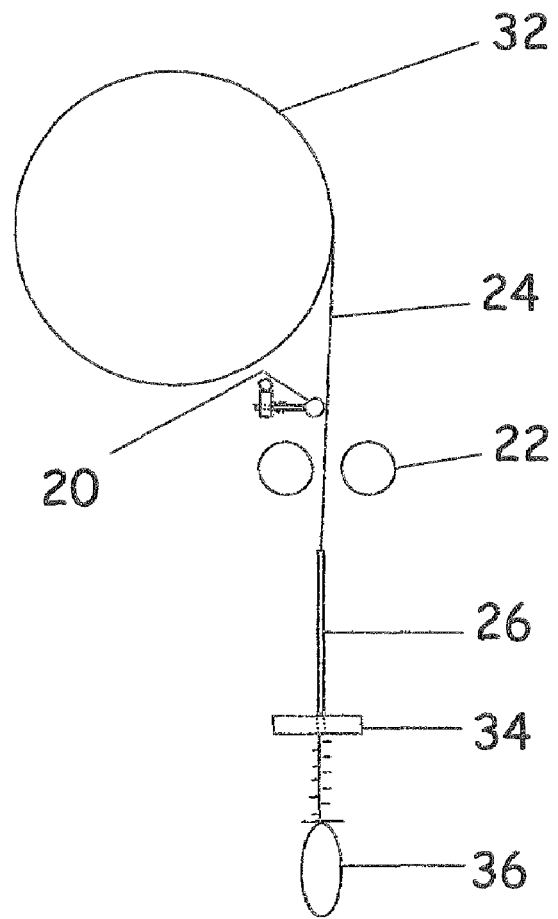
FIG. 2D is a conceptual representation of the present invention in its horizontal lock-out (bridge cannot be driven) position.
Figure 3A:
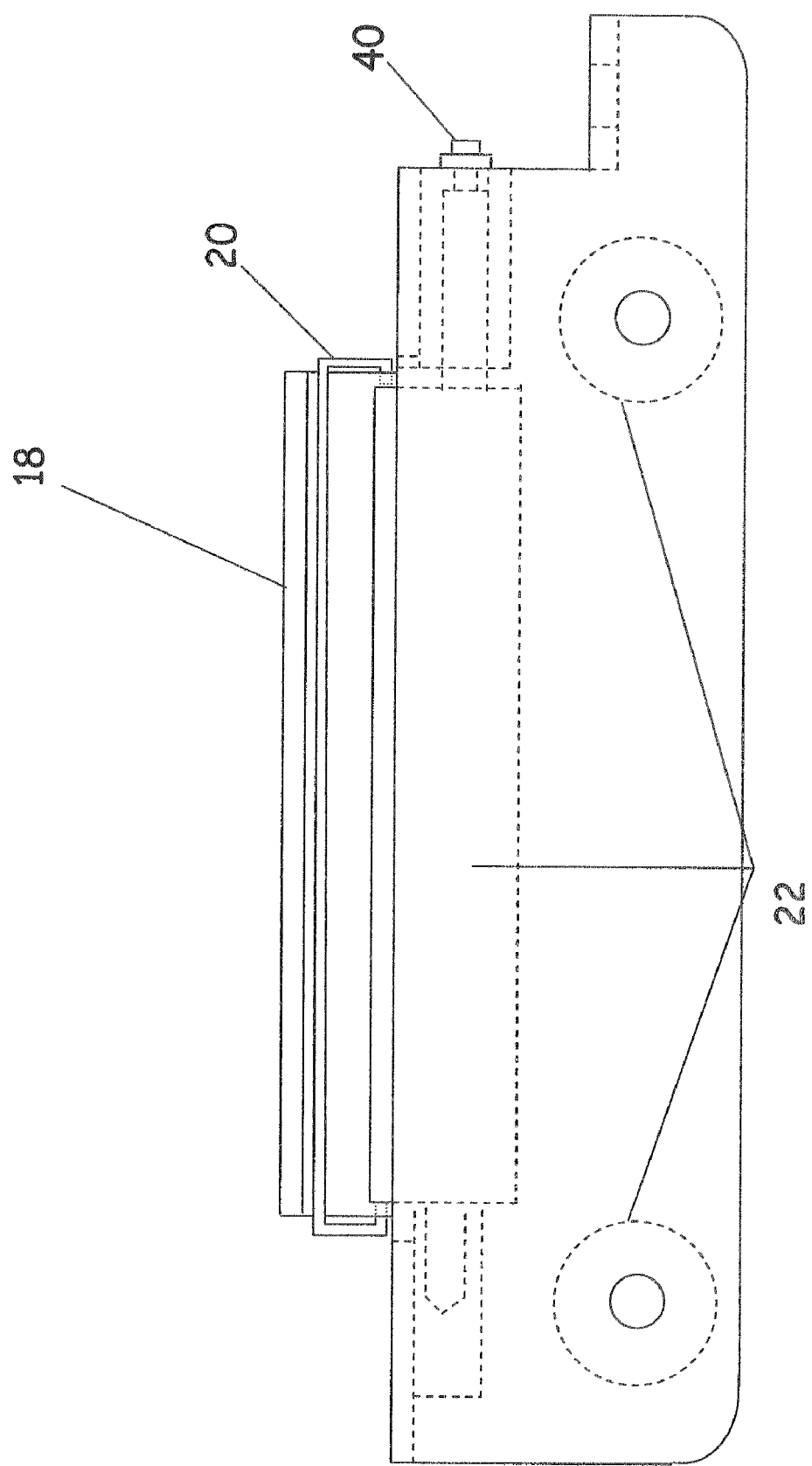
FIG. 3A is a side view of the wire rope guides.
Figure 3B:
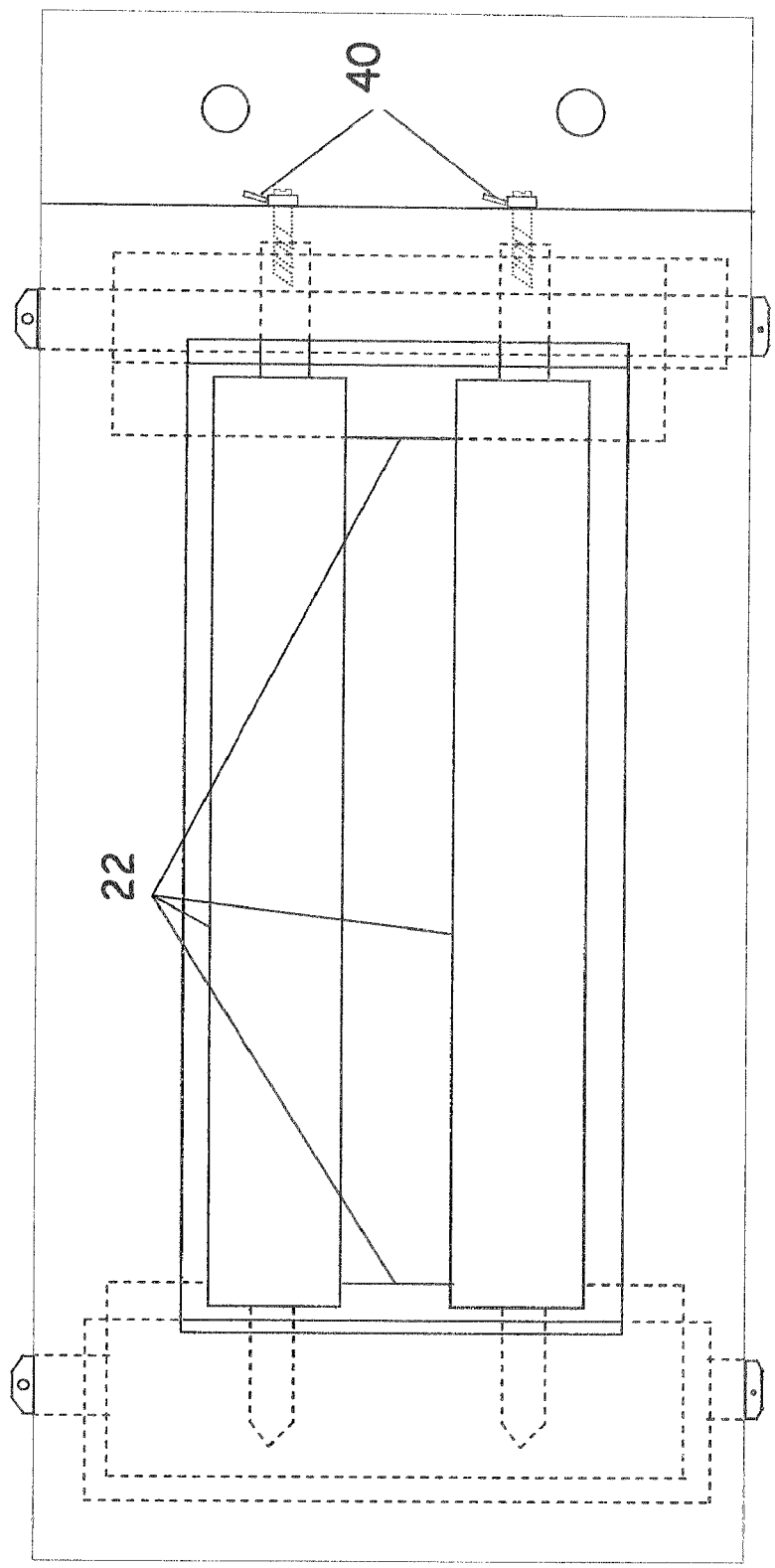
FIG. 3B is a top view of the wire rope guides.

To be more specific regarding certain above described operational characteristics, reference to the remaining drawings is helpful, wherein FIG. 2A is a conceptual representation of the present, invention in its upper limit position, FIG. 2B is a conceptual representation of the present invention in its lower limit position, FIG. 2C is a conceptual representation of the present invention in its horizontal lock-out (bridge can be driven) position, FIG. 2D is a conceptual representation of the present invention in its horizontal lock-out (bridge cannot be driven) position, FIG. 3A is a side view of the wire rope guides 22, FIG. 3B is a top view of the wire rope guides 22, and FIG. 3C is an end view of the wire rope guides 22.

The hoist system 10 typically has four wire rope guide rollers 22, two of which are oriented transversely from the other two wire rope guide rollers in an overlying relationship to the other two wire rope guide rollers.

The horizontal bridge lock-out contact member 20 is made from stainless steel material. The wire rope 24 is also typically made from a stainless steel material.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to he determined only by the appended claims and their equivalents.

What is claimed is:

1. A hoist system for handling a 400 Hz cable used for aircraft electrical servicing, said system being adapted to be attached to a passenger boarding bridge enclosure portion near an aircraft to be electrically serviced, the system comprising:
   a plurality of wire rope guide rollers;
   AC drive means for providing electrical power to said hoist system, said AC drive means being in alternating current electrical communication with a control pendant and said wire rope guide rollers, said AC drive means further being in direct current communication with a bridge horizontal control relay, which is in electrical communication with a horizontal bridge lock-out contact member,
   a wire rope attached on one end to a take-up spool;
   a Fob located near a holder end for said cable;
   an insulator around said wire rope of predetermined length located on an upper side of said FOB;
   grounding electrical configuration means for wire rope position sensing including a lower limit contact bar extending above a plane between said wire rope guide rollers and said take-up spool, said lower limit contact bar serving as means for preventing said wire rope from rewinding in a reverse manner on said take-up spool; and
   said horizontal bridge lock-out contact member extending above a plane between said wire rope guide rollers and said take-up spool wherein when said horizontal bridge lock-out contact member is in contact with said insulator, horizontal bridge movement is allowed and when said horizontal bridge lock-out contact member is in contact with said wire rope, horizontal bridge movement is inhibited,
   wherein said wire rope is electrically configured to be used as an electrical conductor for control voltage through a grounding of said take-up spool to which said wire rope is attached;
   wherein said wire rope guide rollers are electrically connected so as to serve as means for inhibiting overdriving an upper and a lower wire rope limit and for locking out horizontal bridge movement, wherein conflicting commands are not processed and wherein the AC drive requires a circuit to be completed in order for said AC drive to process a single command.

2. The hoist system according to claim 1, wherein when said wire rope in not in a fully retracted position, a circuit to said AC drive is opened thereby inhibiting horizontal bridge movement.

3. The hoist system according to claim 1, wherein said hoist system comprises four wire rope guide rollers, two of which are oriented transversely from the other two wire rope guide rollers in an overlying relationship to said other two wire rope guide rollers.

4. The hoist system according to claim 1, wherein said horizontal bridge lock-out contact member is made from stainless steel material.

* * * * *